3,280,193
CATALYTIC PRODUCTION OF METHACROLEIN FROM ISOBUTENE
Bernard Patrick Whim, Widnes, England, assignor to Imperial Chemical Industries Limited, London, England, a corporation of Great Britain
No Drawing. Filed Oct. 14, 1963, Ser. No. 316,156
Claims priority, application Great Britain, Oct. 24, 1962, 40,276/62
6 Claims. (Cl. 260—604)

This invention relates to a catalytic process for the manufacture of unsaturated aldehydes from olefins and more particularly to a catalytic vapour-phase process whereby an alkenal is made by interaction of an alk-1-ene and oxygen.

According to the present invention there is provided a process for the manufacture of an unsaturated aldehyde which comprises contacting a mixture of an olefin and oxygen at elevated temperature with a copper silico-molybdate as catalyst.

In the process the catalyst specified produces a useful conversion of the olefin to the unsaturated aldehyde without great loss of materials through complete oxidation of the olefin to carbon dioxide and water.

We have found that a very considerable further improvement can be achieved when the catalyst also contains arsenic, i.e. is a copper arseno-silico-molybdate. This catalyst has the advantage of providing an exceptionally high conversion efficiency of olefin to aldehyde.

The precise structure of the catalyst is not clear, but it appears to contain divalent copper in association with thermally stable oxygen acids of silicon and molybdenum, and preferably also pentavalent arsenic. The copper silico-molybdate catalyst may be made for example by mixing aqueous solutions of a copper salt, a molybdate and a silicate, and then evaporating the mixture to dryness and igniting it. The copper arseno-silico-molybdate catalyst may be made similarly, for example by mixing aqueous solutions of a copper salt, a molybdate, a silicate, and arsensic pentoxide or an arsenate, and then evaporating the mixture to dryness and igniting it. It is preferred to use a copper salt, for example the nitrate, which is converted to the oxide by ignition in air or oxygen. Likewise, it is preferred that the silicate, molybdate and arsenate should be such that the cation is lost on ignition; the ammonium salts are particularly useful in this respect. Ignition of the mixture is conveniently carried out at 300° C. to 500° C. in air.

The proportions of copper, silicon and molybdenum (and arsenic, if present) in the catalyst may be varied and selected by trial so as to achieve the optimum combination of physical and catalytic properties for the particular olefin and process conditions to be employed.

The catalyst may be in finely divided form or may be used as granules or pellets, and may if desired be supported upon conventional supporting solids. The mass of catalyst may be static in use, or may be employed using fluidised bed techniques.

The olefin may be a substantially pure material or a hydrocarbon fraction rich in the desired olefin, as may be obtained for example in petroleum cracking or refining processes. The process of the present invention is especially applicable when the olefin is isobutene but other olefins, for instance propene, may also be used.

Pure oxygen may be used, but air or other gas mixtures containing free oxygen may also be used.

The mixture of olefin and oxygen may contain diluents. Such diluents may be for example nitrogen, steam, or other hydrocarbons.

The proportions of oxygen and olefin in the mixture to be contacted with the catalyst may be varied to suit the particular olefin and reaction temperature to be employed. In the case of isobutene, for example, very suitable mixtures are those containing between 1 and 10 parts by volume of oxygen for each part by volume of isobutene.

The composition of the feed gas may be adjusted as desired so as to avoid inflammability or explosive properties.

Suitable temperatures at which the mixture of the olefin and oxygen may be in contact with the catalyst are those in the range between about 230° C. and 570° C.

The mixture of olefin and oxygen may be passed over the catalyst in a reactor vessel provided with appropriate heating and/or cooling means to maintain the catalyst in the reaction zone at the desired temperature, while making due allowance for heat liberated during reaction. It is usually convenient to operate the process with the mixture of olefin and oxygen at substantially atmospheric pressure, any excess pressure above atmospheric pressure being for the purpose of promoting the flow of gas through the reactor and ancillary apparatus. Higher or lower pressures may be used if desired, however.

The rate of flow of the mixture of olefin and oxygen is usually such as to give a contact time between 0.1 and 10 seconds with the catalyst.

The unsaturated aldehyde, for example methacrolein, can be isolated from the gas emerging from the catalyst by conventional means, for example by condensation, scrubbing with water, fractional distillation and combinations of such techniques. Unreacted olefin remaining after extraction of the desired products can, if desired, be recycled to the gas mixture fed in to the catalyst; the diluent can, if economically appropriate, be recycled also. The unsaturated aldehyde so obtained can be converted into an unsaturated carboxylic acid by further oxidation, and the unsaturated carboxylic acid, for example methacrylic acid can be converted into esters. Methacrolein, methacrylic acid, methacrylic esters and corresponding compounds derived from other olefins can be used for the manufacture of a wide variety of polymers and copolymers of industrial value.

The invention is illustrated but not limited by the following examples in which the parts and percentages are by weight unless otherwise stated. The contact times are calculated on the basis of the gas volume at 25° C. and 760 mm. Hg.

*Example 1*

A copper arseno-silico-molybdate catalyst was made as follows:

A solution of silicomolybdic acid was prepared by dissolving 196 parts of ammonium molybdate in 500 parts of cold water and adding a solution of 69.3 parts of sodium silicate (syrupy, specific gravity 1.375) in 250 parts of water. This solution was stirred and acidified to below pH 3 by addition of nitric acid and then to it were added simultaneously a solution of copper nitrate (241 parts of the trihydrate in 200 parts of water) and a solution of arsenic pentoxide (114 parts in 200 parts of water to which sufficient nitric acid was added to assist solution).

The resulting green solution was stirred for 1 hour, and then sufficient dilute aqueous ammonia was added to bring the mixture to pH 7, whereupon a heavy blue-green precipitate was formed. This precipitate was collected by filtration, washed with water, dried at 110° C., and calcined at 350° C.–420° C. for 16 hours. The solid was then crushed, sieved and formed into pellets.

The resulting catalyst was mixed with three times its own volume of "Pyrex" glass particles (5–14 B.S.S. mesh) and used as follows:

A gas mixture consisting of 2.1% by volume of isobutene in air was made up and passed through the mixture of catalyst and glass at 444° C. at a rate which gave a contact time of 1.65 seconds calculated from the volume of catalyst. Analysis of the effluent gas showed that 80.4% of the isobutene was consumed and 59.7% of the isobutene consumed was converted into methacrolein.

This procedure was repeated, using the above isobutene/air mixture to which 15% of its volume of steam was added, passing the gas mixture through the mixture of catalyst and glass at 420° C. at such a rate that the contact time was 1.5 seconds, calculated from the volume of catalyst. Analysis of the effluent gas showed that 38% of the isobutene was consumed, and 84% of the isobutene consumed was converted into methacrolein.

*Example 2*

A copper silico-molybdate catalyst was prepared as follows:

A solution of silicomolybdic acid was prepared by dissolving 186 parts of ammonium molybdate in 500 parts of cold water and adding a solution of 69.3 parts of sodium silicate (syrupy, specific gravity 1.375) in 250 parts of water. This solution was stirred and acidified to below pH 3 by addition of nitric acid, and then to it was added a solution of copper nitrate (361 parts of the trihydrate in 300 parts of water). The resulting green solution was stirred for 1 hour and then sufficient dilute aqueous ammonia was added to bring the mixture to pH 7, whereupon a heavy blue-green precipitate was formed. The mixture was evaporated to dryness and the residue was dried at 110° C. and then calcined at 450° C. for 16 hours. The solid product was then crushed, sieved, and formed into pellets.

The resulting catalyst was mixed with three times its own volume of "Pyrex" glass particles (5–14 B.S.S. mesh) and used as follows:

A gas mixture consisting of 2.8% by volume of isobutene in air was made up, and this was then mixed with 15% of its volume of steam. The resulting gas mixture was then passed through the mixture of catalyst and glass at 459° C. at a rate which gave a contact time of 0.75 second, calculated from the volume of catalyst. Analysis of the effluent gases showed that 69% of the isobutene was consumed, and 32% of the isobutene consumed was converted into methacrolein.

This procedure was repeated using a gas mixture containing 3.0% by volume of isobutene in air, a catalyst temperature of 474° C. and a contact time of 0.25 second, calculated from the volume of catalyst. Analysis of the effluent gas showed that 26.6% of the isobutene was consumed, and that 82.6% of the isobutene consumed was converted into methacrolein.

*Example 3*

A copper arseno-silico-molybdate catalyst was made as described in Example 1, except that instead of being formed into pellets the catalyst was sieved to 14–36 B.S.S. mesh and mixed with four times its own volume of "Pyrex" glass particles (5–14 B.S.S. mesh) before use.

A gas mixture, consisting of (by volume), 10% isobutene, 50% air and 40% nitrogen was passed through the mixture of catalyst and glass at 425° C. at a rate which gave a contact time of 1.2 seconds, calculated from the volume of catalyst. Analysis of the effluent gas showed that 63% of the isobutene was consumed and 93% of the isobutene consumed was converted into methacrolein.

*Example 4*

A solution of silicomolybdic acid was prepared by dissolving 196 parts of ammonium moblydate in 2000 parts of water and adding a solution of 69.3 parts of sodium silicate (syrupy, specific gravity 1.375) in 125 parts of water. This solution was stirred and acidified to below pH 3 by addition of nitric acid and then to it were added simultaneously a solution of copper nitrate (241 parts of the trihydrate in 500 parts of water) and a solution of arsenic pentoxide (114 parts in 750 parts of water to which sufficient nitric acid was added to assist solution).

500 parts (by volume) of the resulting solution were added with stirring to 196 parts (by weight) of silica gel in the form of a dialysed solution of "Syton P" ("Syton P" is a trade name). The mixture was evaporated to dryness and calcined at 400° C., for 16 hours. The solid was then crushed and sieved to 14–36 B.S.S. mesh. The catalyst was mixed with four times its own volume of "Pyrex" glass particles (5–14 B.S.S. mesh) before use.

A gas mixture consisting of (by volume) 2.1% isobutene and 97.7% air was passed through the mixture of catalyst and glass at 400° C. at a rate which gave a contact time of 1.2 seconds, calculated from the volume of the catalyst. Analysis of the effluent gas showed that 53% of the isobutene was consumed and 63% of the isobutene consumed was converted into methacrolein.

A gas mixture consisting of (by volume) 10% isobutene, 50% air and 40% nitrogen was passed through the same mixture of catalyst and glass at 405° C. at the same rate. 33% of the isobutene was consumed and 58% of the isobutene consumed was converted into methacrolein.

*Example 5*

The copper arseno-silico-molybdate catalyst described in Example 3, mixed with four times its own volume of glass particles, was used in the oxidation of propene.

A gas mixture, consisting of (by volume) 10% propene, 50% air and 40% steam was passed through the mixture of catalyst and glass at 440° C. at a rate which gave a contact time of 10 seconds, calculated from the volume of the catalyst. 40% of the propene fed was consumed and 40% of the propene consumed was converted into acrolein.

What I claim is:

1. A process for the production of methacrolein which comprises reacting isobutene with oxygen in the vapour phase at a temperature between 230° C. and 570° C. in the presence of a copper silico-molybdate as catalyst and for a contact time between 0.1 and 10 seconds, the ratio of oxygen to isobutene being in the range of 1 to 10 parts by volume of oxygen for each part by volume of isobutene.

2. A process as claimed in claim 1 wherein the catalyst also contains arsenic.

3. A process as claimed in claim 1 wherein the catalyst is deposited on a support.

4. A process as claimed in claim 1 wherein the reaction is carried out in the presence of an inert gaseous diluent.

5. A process as claimed in claim 4 wherein the inert gaseous diluent is selected from the group consisting of nitrogen and steam.

6. A process as claimed in claim 1 wherein the catalyst is mixed with an inert solid.

References Cited by the Examiner

UNITED STATES PATENTS 3,177,257  4/1965  Detling et al. _____ 260—604

FOREIGN PATENTS 605,502  6/1961  Belgium.
839,808  6/1960  Great Britain.

OTHER REFERENCES

Derwent: Belgian Patents Report No. 82B, page A14, issued December 21, 1961.

LEON ZITVER, *Primary Examiner.*

J. J. SETELIK, R. H. LILES, *Assistant Examiners.*